United States Patent
Vetter et al.

(10) Patent No.: US 8,497,861 B2
(45) Date of Patent: Jul. 30, 2013

(54) METHOD FOR DIRECT VOLUMETRIC RENDERING OF DEFORMABLE BRICKED VOLUMES

(75) Inventors: Christoph Vetter, Plainsboro, NJ (US); Daphne Yu, Yardley, PA (US); Wei Li, Princeton, NJ (US); Wei Hong, Edison, NJ (US)

(73) Assignee: Siemens Aktiengesellschaft, München (DE)

( * ) Notice: Subject to any disclaimer, the term of this patent is extended or adjusted under 35 U.S.C. 154(b) by 502 days.

(21) Appl. No.: 12/365,926

(22) Filed: Feb. 5, 2009

(65) Prior Publication Data

US 2009/0295800 A1 Dec. 3, 2009

Related U.S. Application Data

(60) Provisional application No. 61/057,238, filed on May 30, 2008.

(51) Int. Cl.
*G06T 19/00* (2011.01)
*G06T 17/20* (2006.01)
*G06T 15/40* (2011.01)
*G06T 15/08* (2011.01)

(52) U.S. Cl.
USPC .......... 345/421; 345/419; 345/420; 345/422; 345/423; 345/424

(58) Field of Classification Search
USPC .................................. 345/419–424
See application file for complete search history.

(56) References Cited

U.S. PATENT DOCUMENTS

| | | | | |
|---|---|---|---|---|
| 7,212,203 | B2 * | 5/2007 | Payne | 345/420 |
| 7,538,764 | B2 * | 5/2009 | Salomie | 345/420 |
| 2004/0125103 | A1 * | 7/2004 | Kaufman et al. | 345/419 |
| 2007/0247459 | A1 * | 10/2007 | Li | 345/424 |
| 2007/0262988 | A1 * | 11/2007 | Christensen | 345/424 |

OTHER PUBLICATIONS

Knoll et al., Interactive Isosurface Ray Tracing of Large Octree Volumes, Sep. 20, 2006, IEEE Symposium on Interactive Ray Tracing, pp. 115-124.*

* cited by examiner

*Primary Examiner* — David T Welch
*Assistant Examiner* — Matthew D Salvucci
(74) *Attorney, Agent, or Firm* — Donald B. Paschburg

(57) ABSTRACT

A method for rendering a deformable object. The method includes: obtaining a 3D volumetric voxel dataset of a region, such region having therein an object to be rendered; building a tree hierarchical structure for the obtained volumetric dataset, such tree structure blocks as the nodes of a primary tree hierarchy and bricks being those blocks stored as textures in a video memory; augmenting the primary tree hierarchical structure with maximum and minimum values of the data contained within a block; creating a neighborhood tree hierarchy having for each leaf block of the neighborhood tree hierarchy a reference to the neighboring leaf blocks in the neighborhood tree hierarchy as well as references to neighboring bricks in the neighborhood tree hierarchy; updating the information about minimum and maximum in the primary tree hierarchy by saving for each block the minimum and maximum of the neighboring blocks; and rendering the leaf blocks in visibility order.

20 Claims, 13 Drawing Sheets

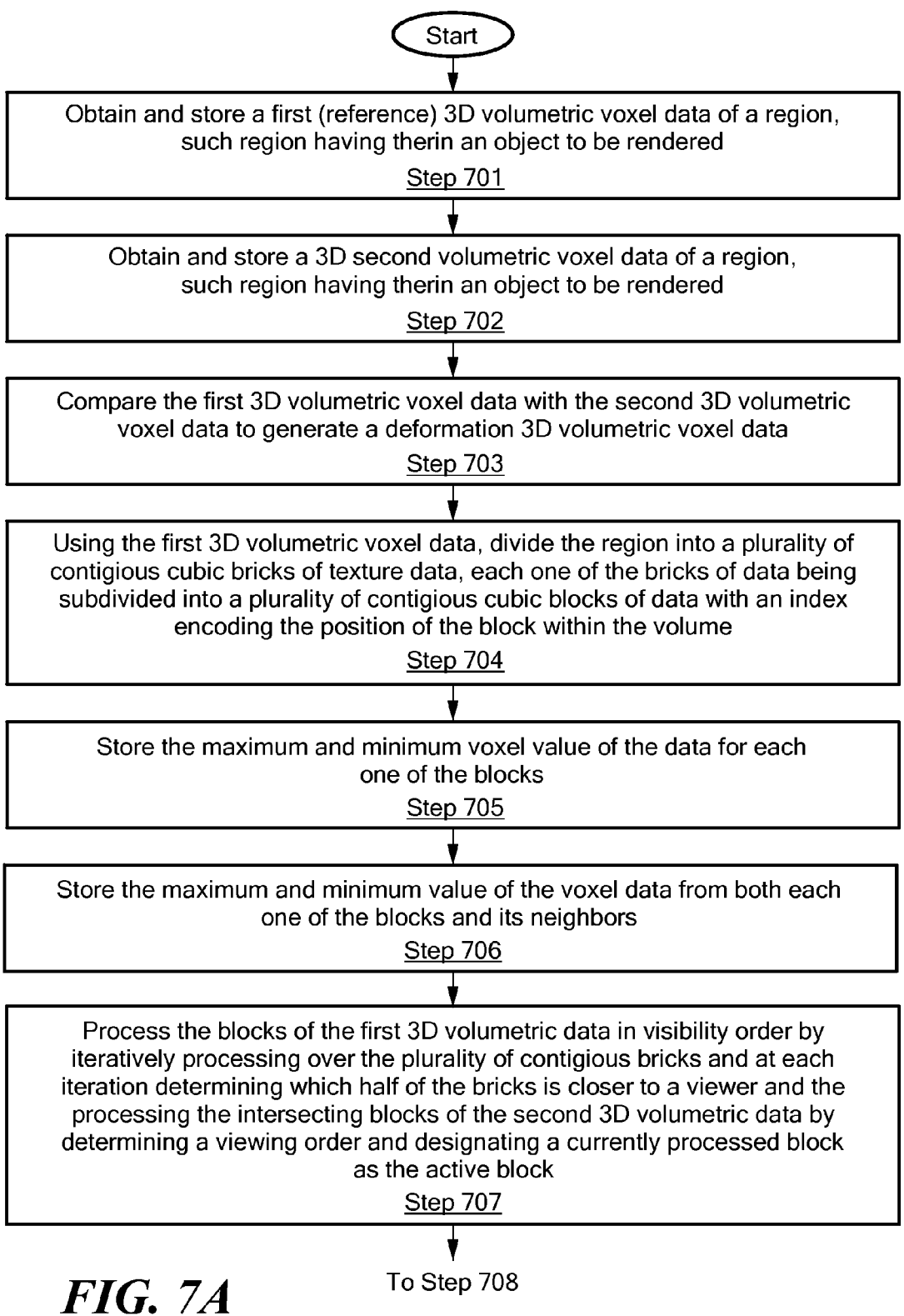
FIG. 7A       To Step 708

Node 0 is the parent of node 1 and 2
Node 1 and 2 are the children of node 0
Node 3 does not have any children but node 1 as parent
Since node 3 does not have any children it is called a leaf node or leaf
Leaf nodes are indicated by circles

METHOD FOR DIRECT VOLUMETRIC RENDERING OF DEFORMABLE BRICKED VOLUMES

CROSS-REFERENCE TO RELATED APPLICATIONS

This application claims priority from U.S. Provisional application No. 61/057,238 filed May 30, 2008, the entire subject matter thereof being incorporated herein by reference.

TECHNICAL FIELD

This invention relates generally to direct volumetric rendering and more particularly to direct volumetric rendering of deformable bricked volumes.

BACKGROUND

As is known in the art, volume rendering generates two-dimensional images from three-dimensional data volumes. Magnetic resonance imaging (MRI), computed tomography (CT) and ultrasound scanning use volume rendering for three-dimensional imaging. Data representing a volume, such as data representing a plurality of two-dimensional planes spaced within the volume or as data representing a plurality of different lines spaced within a volume, is obtained. The 3D representation is rendered from this data. Direct volumetric rendering, as distinguished from surface-based rendering methods, gives insight into the interior of bodies. Therefore, it has grown important for the visualization of scientific simulations and especially in the field of medicine.

Utilization of the GPU for direct volume has gained tremendous popularity in today's computer architecture. The GPU is built to accelerate the rendering of three-dimensional scenes, and its design is tailored to this task. The scenes that are rendered are described by geometry data—vertices that are connected to build lines, triangles and more complex shapes—and texture data—images that are mapped onto the geometry. The graphics pipeline consists of three main stages, in which the incoming data is processed, the vertex stage, the geometry stage and the fragment stage. GPUs support programmability in all the three stages. The geometry data (like vertex position, texture coordinates etc.) is transformed according to the currently active vertex shader. In the geometry stage, the geometric primitives are generated from the provided vertices. In the fragment stage, fragment shaders are executed for each fragment, with the interpolated vertex attributes as input. This is the stage that is mostly exploited for general purpose computations on the GPU (GPGPU).

Numerous algorithms for visualizing volumes have been published (see Engel K., Hadwiger M., Kniss J. M., Lefohn A., Rezk-Salama C., Weiskopf D.: *Real-Time Volume Graphics*. A K Peters, 1998). Ray-casting is an image-order approach that traces viewing rays through the volume and samples it at discrete positions. Texture slicing is an object-based approach. The volume is sampled by slices and the result is the projected and composited. Splatting is another object-order technique that works by projecting voxels onto the image plane.

One of the challenges is the ever increasing amount of data that is to be visualized, due to advances in image acquisition technology or simulation methodologies. Since the amount of data easily surpasses the amount of video memory available on current GPUs, brick-based volume rendering methods are combined with an efficient memory management that swaps in the data that is needed from the main memory (or even from hard disk) to the video card memory. Bricking is an important technique in texture-based volume rendering. In principle, bricking partitions a volumetric dataset into multiple sub-volumes, each called a brick.

The purpose of brick-based volume rendering or bricking mainly falls to two. 1) Bricks containing only invisible voxels are skipped to gain acceleration; 2) Volumes larger than graphics memory can be rendered by downloading a subset of all the bricks to graphics memory for each rendering pass. With multiple rendering passes, all the visible voxels are processed. Within each brick, voxels can be further subdivided into blocks, and invisible blocks are skipped. Therefore, the minimal granularity of rendering is block, while the minimal granularity of texture downloading is brick. Obviously, a block has to be completely enclosed in the corresponding brick. See Wei Li, "Invisible Space Skipping with Adaptive Granularity for Texture-based Volume Rendering", Published U.S. Patent Application Pub. No. 2006/0164410 published Jul. 27, 2006 and Published U.S. Patent Application No. 2007/0247459 published Oct. 25, 2007 both assigned to the same assignee as the present invention, the entire subject matter of both being incorporated herein by reference, for more details about bricking.

As is also known in the art, it is frequently desired to combine or fuse different images. For example, modern medical technology provides different modalities for acquiring 3D data, such as computed tomography ("CT"), magnetic resonance imaging ("MRI"), positron emission tomography ("PET"), and ultrasound. The information obtained from different modalities is usually complementary; for example, CT provides structural information while PET provides functional information. In another example, it may be desired to fuse one CT scan of an patient taken at one time with another CT image of the patient at a later time to study the progression of a tumor being observed within the patient. Thus, it is generally desirable to fuse multiple volumetric datasets.

Most existing fusion renderers require that all volumes be aligned and have the same resolution, thereby necessitating that all volumes be re-sampled except the one that is treated as the reference volume. The reference volume generally refers to the volume with the finest resolution to avoid losing information—the other volumes are re-sampled according to the grid of the reference volume. The reference volume may need to be expanded to fill the bounding box enclosing all volumes. The aggregate bounding box of the ensemble of volumes can be significantly larger than individual bounding boxes when the orientation of a volume happens to lie near the diagonal of another volume. The number of voxels after re-sampling is proportional to the volume of the aggregate bounding box. Therefore, re-sampling can significantly increase the processing time (both initially and for each rendering) as well as the amount of memory required.

The volumes usually need to be registered because different scanners can have different coordinate systems (in terms of origins and orientations). During registration all volumes, except the reference volume, are referred to as floating volumes. Various transformations, such as rotation, translation, scaling, and shearing, are applied to the floating volumes so that their features match those in the reference volume. Furthermore, re-sampling must be performed again after such a transformation. Registration typically requires user interaction, with visual feedback, that is repeatedly applied to refine the registration. The resample-based fusion render cannot response quickly enough for such requirements.

Bricking is an important technique in texture-based volume rendering. In principle, bricking partitions a volumetric dataset into multiple sub-volumes, each called a brick. The purpose of bricking mainly falls to two. 1) Bricks containing only invisible voxels are skipped to gain acceleration; 2) Volumes larger than graphics memory can be rendered by downloading a subset of all the bricks to graphics memory for each rendering pass. With multiple rendering passes, all the visible voxels are processed. Within each brick, voxels can be further subdivided into blocks, and invisible blocks are skipped. Therefore, the minimal granularity of rendering is block, while the minimal granularity of texture downloading is brick. Obviously, a block has to be completely enclosed in the corresponding brick. See Wei Li, "Invisible Space Skipping with Adaptive Granularity for Texture-based Volume Rendering", Published U.S. Patent Application Pub. No. 2006/0164410 published Jul. 27, 2006 and Published U.S. Patent Application No. 2007/0247459 published Oct. 25, 2007 both assigned to the same assignee as the present invention, the entire subject matter of both being incorporated herein by reference, for more details about bricking.

A fusion renderer handles multiple volumes that usually overlap in 3D space. As discussed in co-pending U.S. patent application Ser. No. 11/235,410 filed Sep. 26, 2005, assigned to the same assignee as the present invention, the subject matter thereof being incorporated herein by reference. The basic idea described in U.S. patent application Ser. No. 11/235,410 is to render a whole slice through all blocks, hence performing the rendering in slice-by-slice order, instead of block-by-block. Briefly, the method includes the steps of: (a) building a hierarchical structure for each of a plurality of volumes; (b) finding all blocks in each of the hierarchical structures that intersect a slicing plane; (c) dividing each of the plurality of volumes into stacks of parallel slices and sorting the parallel slices by visibility order; (d) choosing a next slice in the sorted parallel slices, the next slice belonging to a current volume; (e) changing rendering parameters if the current volume is different from a previous volume in a previous iteration of step (d); (f) rendering, based on the rendering parameters, the next slice by intersecting the slicing plane with the blocks corresponding to the current volume; and (g) repeating steps (d)-(f) until all of the sorted parallel slices are rendered. It is desirable to keep each volume independent, rather than resampling them to the same resolution. Each volume maintains its own space-skipping structure. This has the advantage in rendering speed, memory consumption, and flexibility.

When a dataset is partitioned into bricks, not all voxels are accessible during a rendering pass. Therefore, an algorithm combining bricking and fusion have to guarantee that those inaccessible voxels are not rendered for the current pass, and any visible voxels are rendered exactly once. It is a challenging task, especially when invisible bricks and blocks are skipped. For simplicity, the previous co-pending U.S. patent application Ser. No. 11/235,410 only handles a simplified bricking scheme. That is, a volume is only bricked along the Z axis. In other words, each brick has at most two neighbors.

Bricking only in Z results in slab-shaped bricks, which unfortunately is less efficient in performance. Besides due to graphics hardware limitation, dataset whose X and Y sizes exceeding certain number, currently it is 512, cannot be rendered. Graphics memory is a precious resource in a system.

Thus, the most intuitive approach to rendering volumes that do not fit into video memory is bricking. As noted above, in this method, the 3D volume is subdivided into rectangular regions called bricks. These bricks are then rendered in a divide-and-conquer approach, using slicing or ray casting. The size of the bricks is chosen in order to achieve the best performance. Loading only those bricks that are actually needed with a given transfer function reduces the amount of memory transfer. In that respect small bricks are better than large bricks. On the other hand, larger bricks reduce the amount of overhead for managing these bricks and transferring the bricks into GPU memory. Another disadvantage of small bricks appears when using duplicated voxels at brick boundaries to avoid sampling artifacts. The smaller the brick is, the larger the duplicated space is in proportion to the brick size.

Therefore a two-level hierarchy is advantageous [see Engel K., Hadwiger M., Kniss J. M., Lefohn A., Rezk-Salama C., Weiskopf D.: *Real-Time Volume Graphics*. A K Peters, 1998]. A coarse subdivision of the volume into bricks allows out-of-core rendering, while not wasting too much video memory, and a finer-grained subdivision into blocks allows empty-space skipping at a smaller level. For each of these subdivisions, the minimum and maximum values of the voxel contained are saved (min-max information for empty-space skipping). Regions whose interval of values is mapped to a completely transparent value (with respect to a given transfer function), are not rendered at all. Empty texture bricks are not even loaded, while empty blocks are skipped. A common method for partitioning a volume into blocks is the Binary Space Partitioning (BSP) method, which works by recursively subdividing the volume in two halves to construct a hierarchical tree data structure, as shown in FIG. 8. Some of the nodes are not subdivided any further, if they are already too small. That happens because the volume does not necessarily have power-of-two dimensions. Leaves are the nodes that are not subdivided any further, and are called the nodes that subdivide a node, children of that subdivided node. This is clarified in FIG. 8 where Node 0 is the parent of node 1 and 2; Nodes 1 and 2 are children of node 0; and Node 3 does not have any children but node 1 as parent. Since node 3 does not have any children it is called a leaf node or leaf. Leaf nodes are indicated by circles.

As an added benefit, the BSP-tree also allows the visibility sorting that is necessary for correctly compositing the visualization of the blocks.

On current graphics hardware, an efficient method to perform a deformation based on a vector field is texture space deformation using fragment shaders. Whenever the volume texture is sampled, an associated deformation texture is sampled as well. This texture does not have to be of the same size. The deformation texture stores a three-dimensional vector in its RGB channels. The original texture coordinate plus the offset vector determine a new sampling position. The volume texture is then sampled at this point.

At the same time, deforming volumes is important for applications like registration or modeling. This affects the spatial structure of the data, so that samples from different bricks, not only from the currently active brick, must be accessed. This leads to problems, when a sample that is moved by the deformation field needs to be sampled from a different brick than the active one.

Combining the bricked large volume with deformation leads to several problems:

1. Deformation fields possibly destroy or at least reduce the locality of data and do not adhere to brick boundaries. Using brick-based volume rendering algorithms, the necessary bricks for the rendering are loaded into GPU memory as needed. This approach does not work with deformable volume rendering, since the deformation does not stop at brick boundaries, so for the rendering of one deformed brick, neighboring bricks need to be accessed as well.

2. Preprocessing the volume does not work when the deformation field is dynamic.

3. The deformation destroys the information that is used for empty-space skipping, like the maximum and minimum values within a brick.

Papers like Fang S., Srinivasan R., Huang S., Raghavan R.: Deformable Volume Rendering by 3D Texture Mapping and Octree Encoding, IEEE Visualization '96, pages 73-80, 1996 only address the deformation part, but do not deal with the challenges of deforming large volumes that need to be displayed interactively. In Schulze F., Bühler K., Hadwiger M.: Interactive Deformation and Visualization of Large Volume Datasets, GRAPP 2007, pages 39-46, 2007, the researchers focus on a physically-based deformation, but do not deal with volumes that do not fit into graphics memory.

Based on the existing prior art, it is evident that there is the need for a new inventive method that can solve the issues mentioned above and allow efficient, interactive, and dynamic deformation even for large volumes.

SUMMARY

In accordance with the present invention, a method is provided for rendering to a viewer an object from imaging data of the object, such imaging data including a first 3D volumetric voxel dataset of a region, such region having therein the object to be rendered and a second 3D volumetric voxel dataset of a region, such region having therein the object to be rendered. The method includes: (A) comparing the first 3D volumetric voxel dataset with the second 3D volumetric voxel dataset to generate a deformation 3D volumetric voxel dataset; (B) dividing the first 3D volumetric voxel dataset into a hierarchical tree comprising a plurality of contiguous cubic bricks of texture data, each one of the bricks being subdivided into a plurality of contiguous cubic blocks of data with an index encoding the positions of the blocks within the first 3D volumetric voxel dataset; (C) determining visible blocks from a set of minimum and maximum voxel values of the data from both each one of the blocks and its neighboring; (D) processing the visible determined blocks to determine which half of the hierarchical tree is closer to the viewer of the object; and (E) processing each visible block in the hierarchical tree including adding deformation values from the deformation 3D volumetric voxel data to render the object.

In one embodiment, the method includes: obtaining a 3D volumetric voxel dataset of a region, such region having therein an object to be rendered; building a tree hierarchical structure for the obtained volumetric dataset, such tree structure having blocks as the nodes of the tree hierarchical structure and bricks, said bricks being stored as textures in a video memory; augmenting the tree hierarchical structure with maximum and minimum values of the data contained within each one of the blocks; creating a neighborhood data structure for each leaf block of the tree hierarchical structure such neighborhood data structure having for each leaf block of the tree hierarchical structure references to blocks neighboring each one of the each leaf block of the tree hierarchical structure; updating information about minimum and maximum in the tree hierarchical structure by storing for each leaf block in the tree hierarchical structure the minimum and maximum values of blocks referenced thereto by the neighborhood data structure; and rendering the leaf blocks.

In one embodiment, the rendering is performed in visibility order.

In one embodiment, the rendering is performed in arbitrary order.

In one embodiment, the rendering the leaf blocks in visibility order comprises: visiting the leaf blocks in visibility order, skipping those blocks whose minimum to maximum value are mapped to invisible values according to a current lookup table; binding brick textures of bricks neighboring a currently active block to texture stages and passing indices describing position in the tree hierarchical structure, as values to a shader performing the rendering; and rendering the leaf block invoking a shader program that renders fragments of the block according to the geometry of the block.

In one embodiment, the rendering of the leaf block invokes a shader program that renders fragments of the brick according to the geometry, comprises: performing a lookup into deformation textures stored in a lookup table according to the position in the active block to obtain a deformation vector; adding the deformation vector to the current position to obtain position after deformation; computing an index of the brick that encloses the position after the deformation; finding a sampler from the computed index a corresponding texture and fetching a voxel value from this texture; and mapping the fetched voxel value to a color according to a lookup table.

With such an arrangement, volumes larger than the available graphics memory can be rendered, and bus transfers of data between the Graphics Processing Unit (GPU) and Central Processing Unit (CPU) within a computer system is reduced by skipping those bricks that do not contribute to the final image. In this invention, we describe methods to integrate deformation into brick-based volume renderers or ray casters. Our approach allows dynamic deformations on large datasets. Expensive preprocessing steps like resampling are not required. The defined deformations can cross brick boundaries and we impose only few restrictions on the form of these deformation fields.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A and 7B, are more detailed flow chart of the process of rendering deformable bricked volumes of data according to the invention;

Like reference symbols in the various drawings indicate like elements.

DETAILED DESCRIPTION

Figure 1:
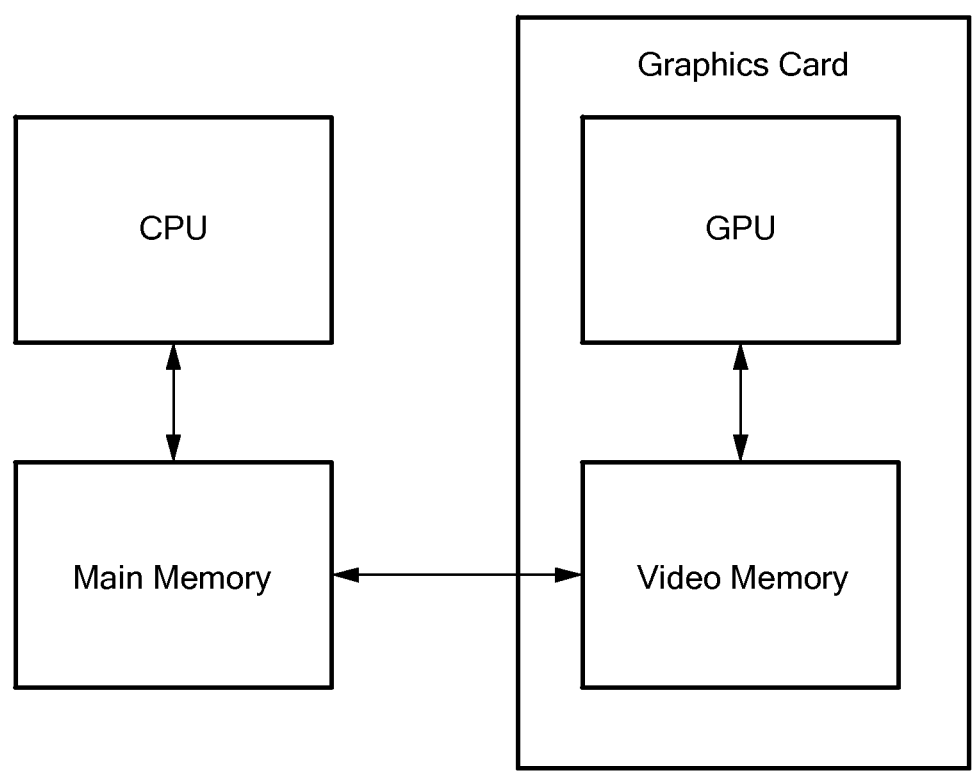
FIG. 1 is a workstation capable of rendering large volume data according to the invention.

Referring now to FIG. 1 a workstation is shown capable of rendering large volume data according to the invention. A typical configuration consists of a powerful central processor (CPU) and a large amount of memory and data storage, containing a Graphic Processing Unit (GPU) as additional high-speed computing device. A graphics card in the GPU has fast access to a video memory in the GPU, the CPU has fast access to a main memory, but the transfer between the main memory and video memory is more restricted.

Figure 10:
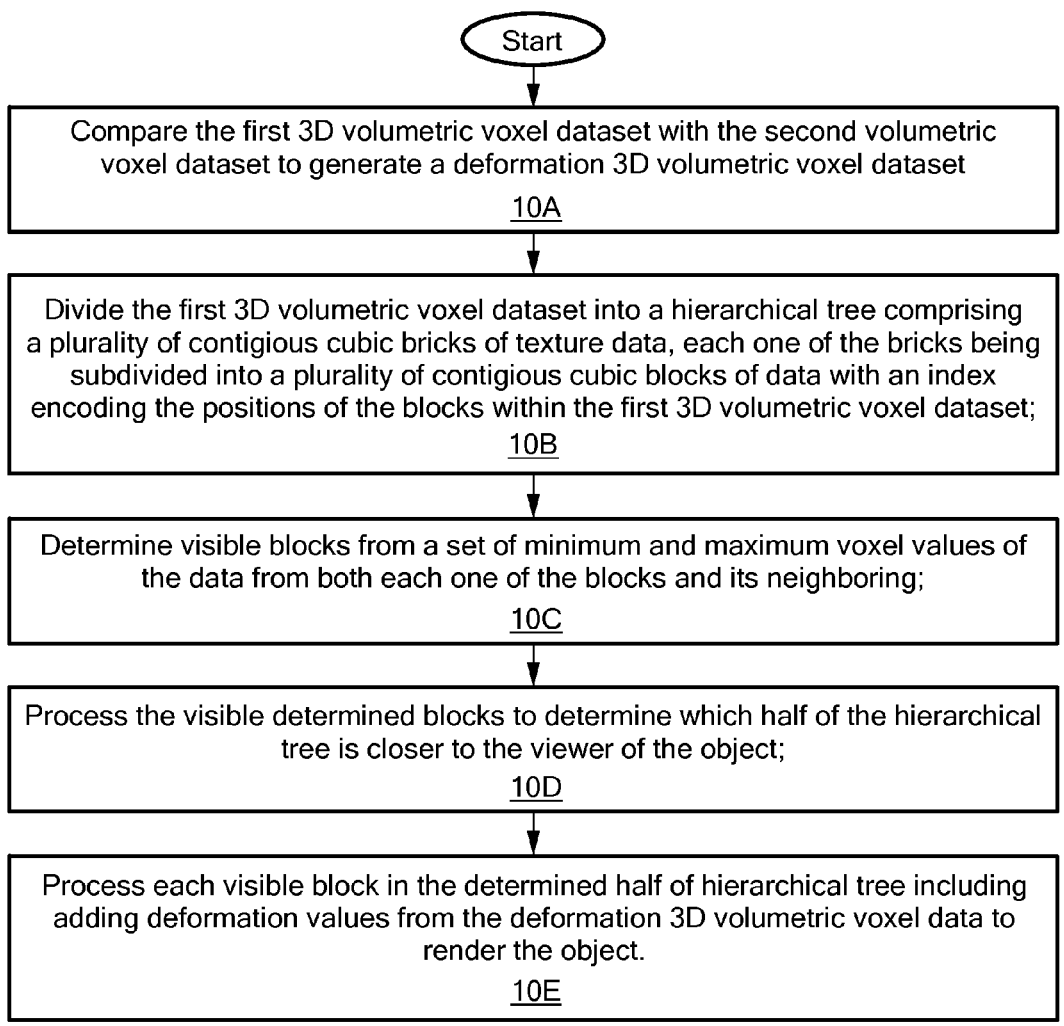
FIG. 10 is an overall flowchart of the process according to the invention for rendering to a viewer an object from imaging data of the object, such imaging data including a first 3D volumetric voxel dataset of a region, such region having therein the object to be rendered and a second 3D volumetric voxel dataset of a region, such region having therein the object to be rendered.

Referring now to FIG. 10, an overall flowchart is shown of the process according to the invention for rendering to a viewer an object from imaging data of the object, such imaging data including a first 3D volumetric voxel dataset of a region, such region having therein the object to be rendered and a second 3D volumetric voxel dataset of a region, such region having therein the object to be rendered. The method includes: comparing the first 3D volumetric voxel dataset with the second 3D volumetric voxel dataset to generate a deformation 3D volumetric voxel dataset, Step 10A; dividing the first 3D volumetric voxel dataset into a hierarchical tree comprising a plurality of contiguous cubic bricks of texture data, each one of the bricks being subdivided into a plurality of contiguous cubic blocks of data with an index encoding the positions of the blocks within the first 3D volumetric voxel dataset, Step 10B; determining visible blocks from a set of minimum and maximum voxel values of the data from both each one of the blocks and its neighboring, Step 10C; processing the visible determined blocks to determine which half of the hierarchical tree is closer to the viewer of the object, Step 10D; processing each visible block in the hierarchical tree including adding deformation values from the deformation 3D volumetric voxel data to render the object, Step 10E.

Figure 2A:
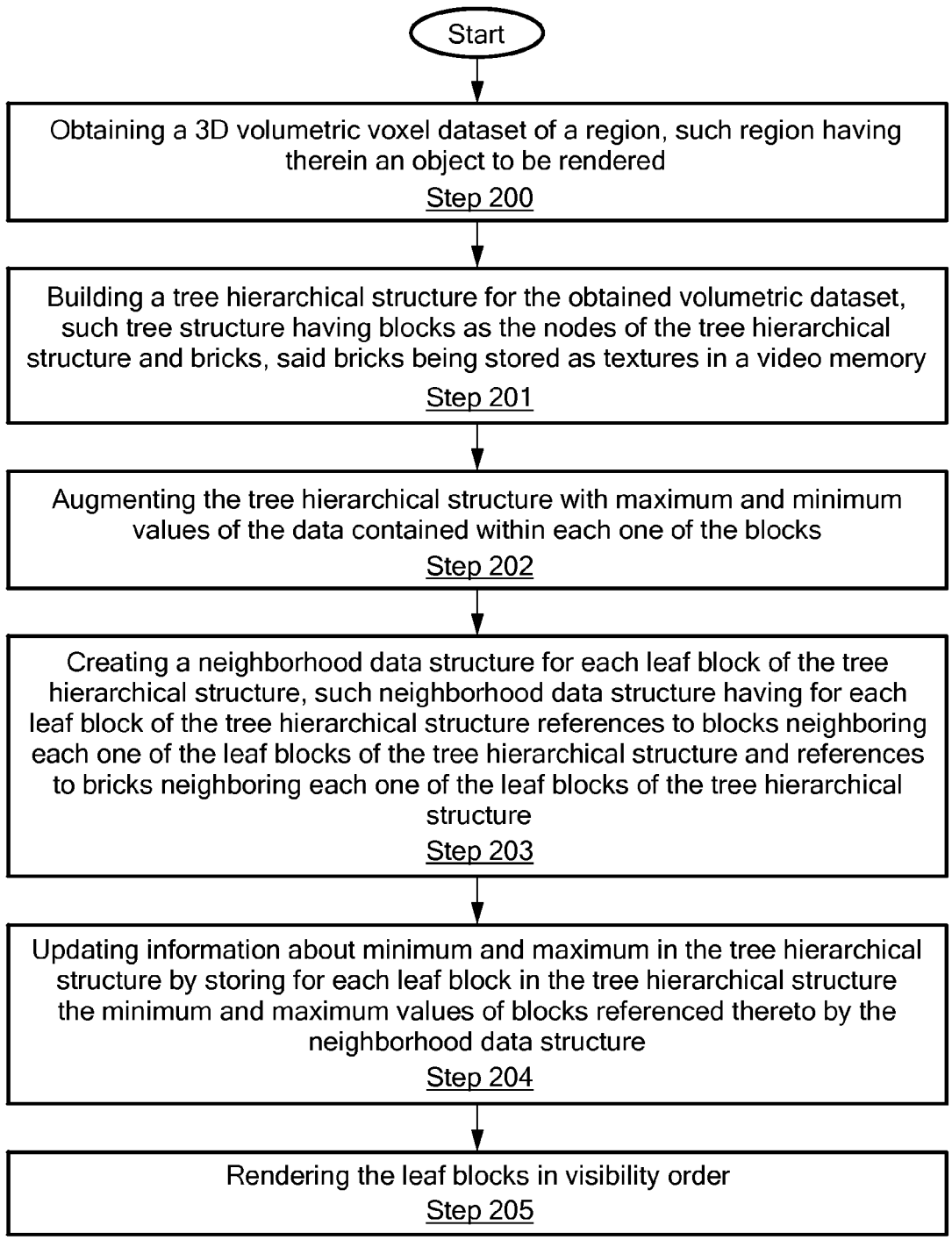
FIGS. 2A-2C are together an overall flowchart of the process of rendering deformable bricked volumes of data according to the invention.
Figure 2B:
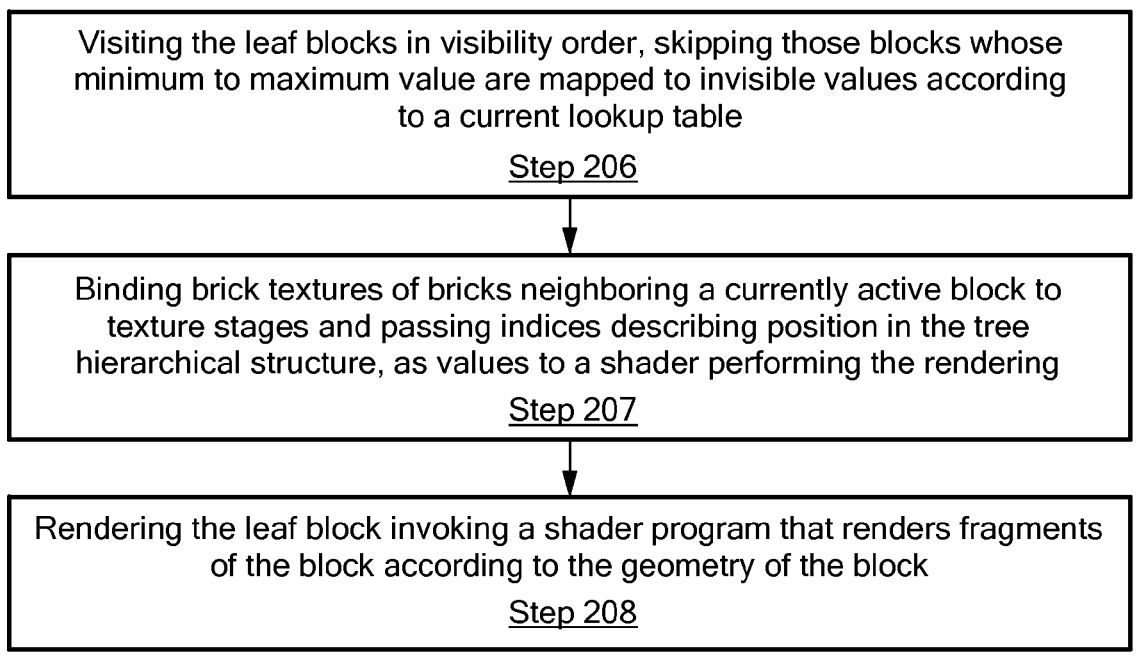
Figure 2C:
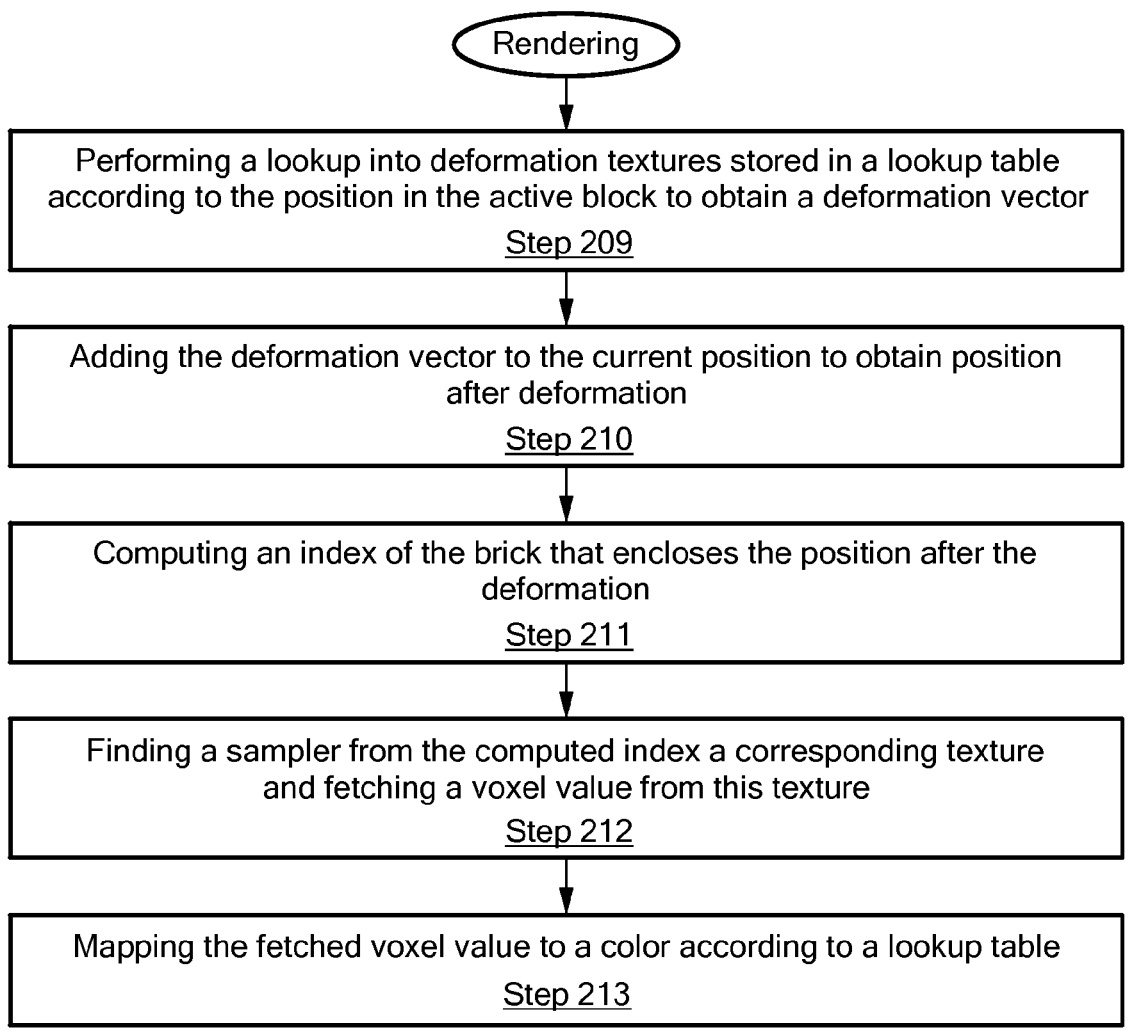

Referring now to FIGS. 2A-2C, a more detailed overall flowchart of the process for rendering a deformable object is shown. It shown be understood that the deformation may result for a sequence of images taken over a period of time of the object, or may result from an images taken by a plurality of different modalities of the object. Here, the object is an anatomical object, such as a human organ or bone structure.

The method for rendering a deformable object includes: obtaining a 3D volumetric voxel dataset of a region, such region having therein an object to be rendered, step 200 (such data may be obtained from Magnetic resonance imaging (MRI), computed tomography (CT) and/or ultrasound scanning, for example); building a tree hierarchical structure for the obtained volumetric dataset, such tree structure having blocks as the nodes of the tree hierarchical structure and bricks, said bricks being stored as textures in a video memory, step 201; augmenting the tree hierarchical structure with maximum and minimum values of the data contained within each one of the blocks, step 202; creating a neighborhood data structure for each leaf block of the tree hierarchical structure, such neighborhood data structure having for each leaf block of the tree hierarchical structure references to blocks neighboring each one of the each leaf block of the tree hierarchical structure, step 203; updating information about minimum and maximum in the tree hierarchical structure by storing for each leaf block in the tree hierarchical structure the minimum and maximum values of blocks referenced thereto by the neighborhood data structure, step 203; and rendering the leaf blocks, step 205. The rendering can be performed in visibility order. Otherwise an arbitrary order can be used as well and the visibility ordering skipped.

The rendering the leaf blocks in visibility order comprises: visiting the leaf blocks in visibility order, skipping those blocks whose minimum to maximum value are mapped to invisible values according to a current lookup table, step 206; binding brick textures of bricks neighboring a currently active block to texture stages and passing indices describing position in the tree hierarchical structure, as values to a shader performing the rendering, step 207; and rendering the leaf block invoking a shader program that renders fragments of the block according to the geometry of the block, step 208.

The rendering of the leaf block invokes a shader program that renders fragments of the brick according to the geometry, comprises: performing a lookup into deformation textures stored in a lookup table according to the position in the active block to obtain a deformation vector, step 209; adding the deformation vector to the current position to obtain position after deformation, step 210; computing an index of the brick that encloses the position after the deformation, step 211; finding a sampler from the computed index a corresponding texture and fetching a voxel value from this texture, step 212; and mapping the fetched voxel value to a color according to a lookup table, step 213.

More particularly, the method includes: Preprocessing; Rendering the Leaf Blocks in Visibility Order; and Invoking Shader Program, as described in more detail below:

Preprocessing

Figure 9:
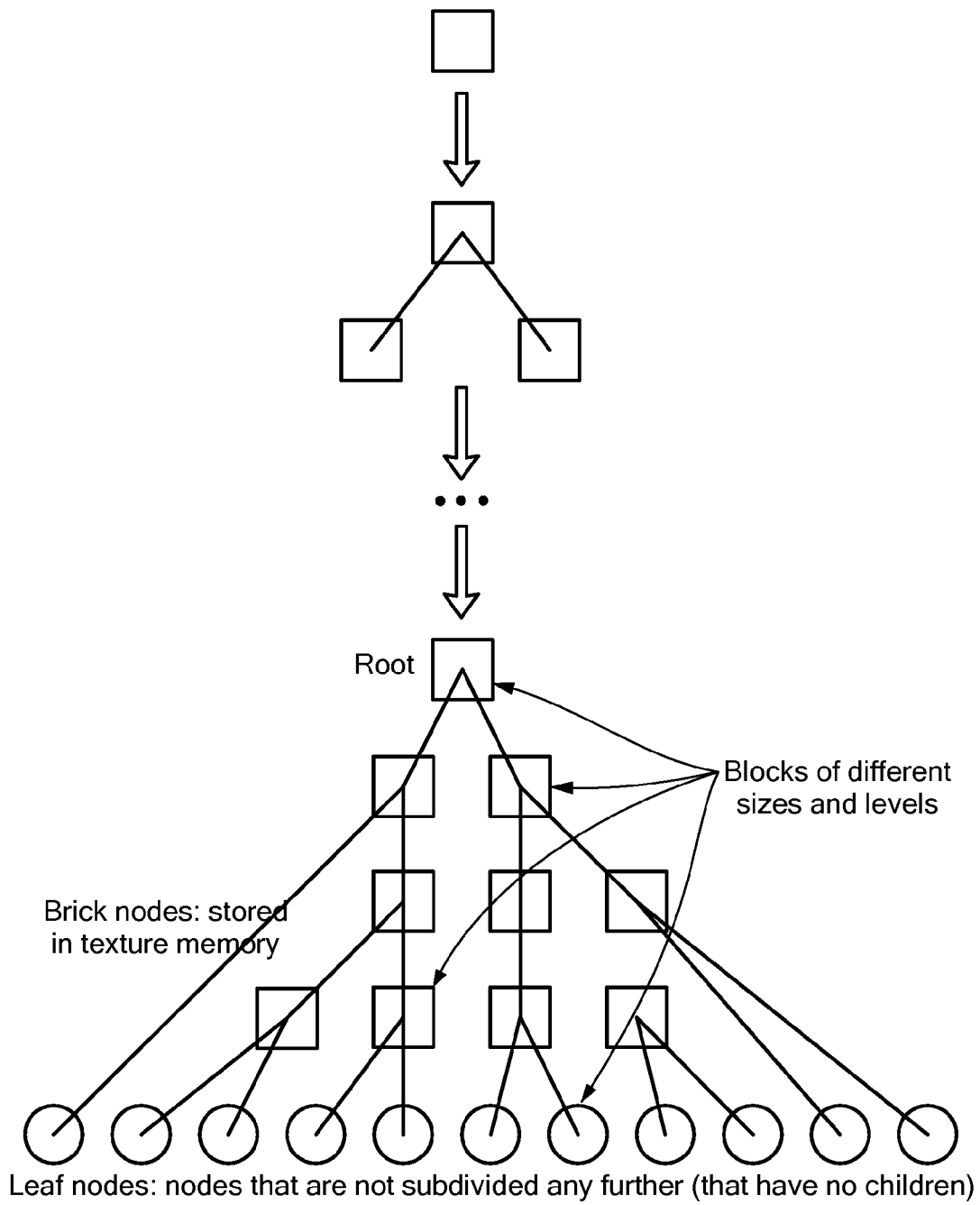
FIG. 9 is a hierarchical tree data structure useful in understanding the invention.

A 3D volumetric voxel dataset of a region is obtained, such region having therein an object to be rendered, step 200; The 3D volumetric voxel dataset is then divided into bricks suitable for deformation. The volume is subdivided on two levels. First, the three-dimensional volume is divided into texture bricks. On the level of geometry data, the cube that contains the volume is subdivided into blocks that are rendered separately (step 201). This information is recorded in a BSP tree, as shown in FIG. 9. In practical implementation, we impose the constraint that a deformation is at most of the size of half a brick. This means that for a block with this size constraint, only 8 bricks need to be taken into consideration. When allowing deformations up to a brick size, there are 27 textures that might be accessed.

Common acceleration techniques for direct volume rendering are early ray termination, occlusion queries and empty space skipping. While the first two methods remain unchanged when using a deformation field, empty space skipping has to be adapted to the existence of a deformation field. For empty space skipping, the volume is preprocessed so that each block is tagged with the maximum and minimum value in it (step 202).

An additional data structure is the neighborhood information for the texture bricks. The spatial relationship of the bricks is recorded here, for fast indexing, beyond what the BSP-Tree allows. So each brick has access to a list of directly adjacent neighbors (step 203).

When using the deformation field, the minimum and maximum values cannot be used directly anymore, because the deformation field reaches into neighboring blocks. But with the knowledge which neighbors can be accessed, the maximum and minimum values after the deformation can be approximated. For each block there is a group of blocks that might be accessed under the current restrictions on the deformation field (that is the maximum deformation allowed). The active block is tagged with the minimum value of all these blocks as minimum and the maximum value of all these blocks as maximum (step 204). Note that while the deformation can have at most the size of half a brick, a smaller known limit on the deformation size is preferable, since it allows us to skip more blocks.

Figure 3:
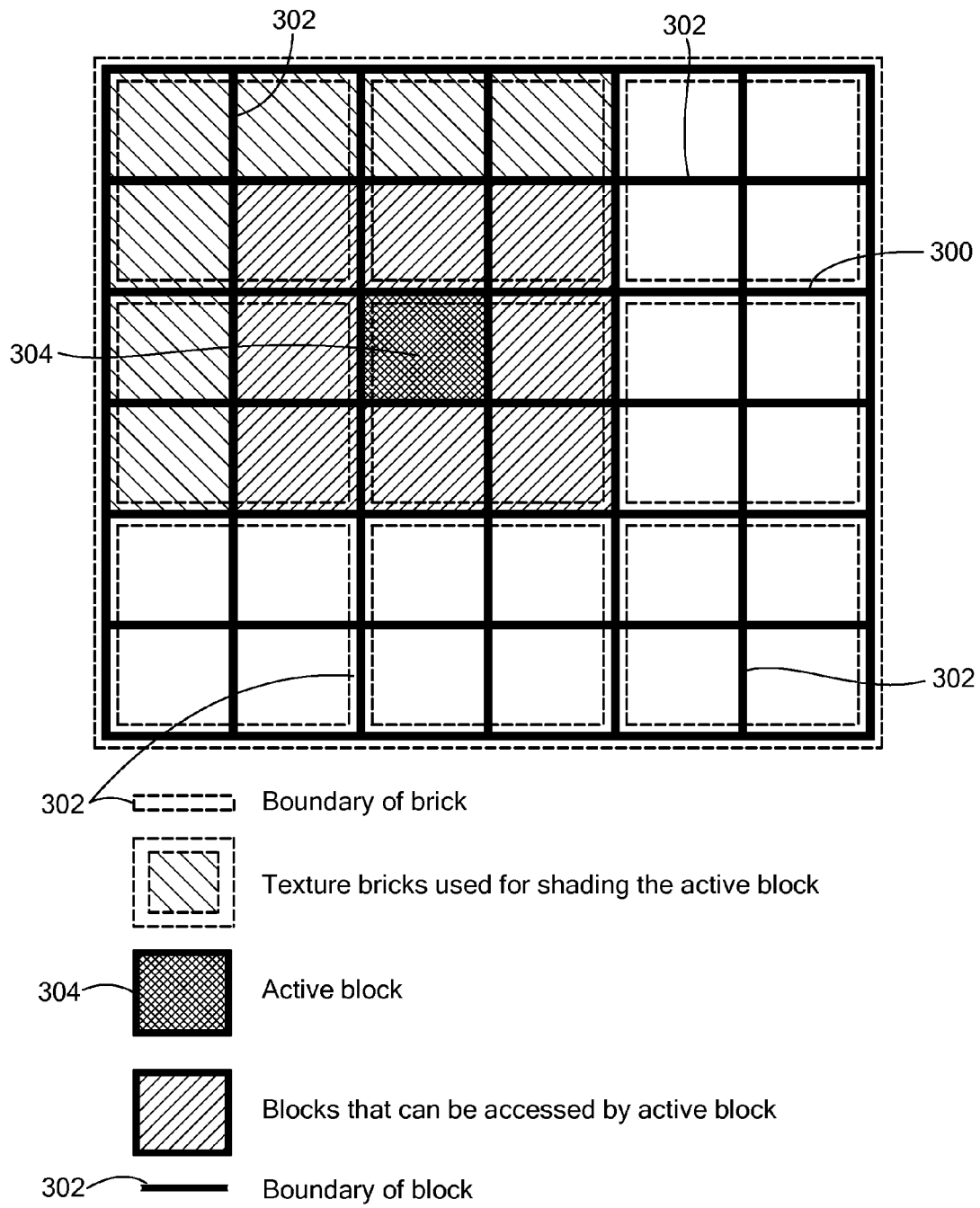
FIG. 3 shows brick access patterns and is useful in understanding the basic approach to brick-based deformation for a simplified two-dimensional view.

FIG. 3 shows the basic approach to brick-based deformation for a simplified two-dimensional view. The lines 300 indicate how the volume is divided into texture bricks. The lines 302 indicate the subdivision of the volume into blocks. Note that the block boundaries are aligned with the brick boundaries. The blocks can be at most as large as half the brick, but a brick might be divided into more than 4 (or in the three-dimensional case 8) blocks. The block 304 is the block that is being rendered (sometimes also referred to as the active block). Based on the assumption that the deformation is at most as large as half a brick, the blocks 306 denote all the blocks that might be accessed after the deformation. They lie in four bricks that must be loaded at the same time, when the block 304 is rendered.

Rendering the Leaf Blocks in Visibility Order (Steps 206-208)

In order to iterate over the block depending on the view direction an iterator is used. The blocks are rendered in visibility order determined by the BSP tree. According to a filter, invisible blocks are filtered out.

With a specific transfer function given and the minimum and maximum values per block, it can be determined whether a block contains visible data or not. Invisible blocks are skipped.

Visualization of a subset of the deformed volume. The deformation does not necessarily have to be performed on the whole volume. If the user is interested in deforming only part of the volume, a deformation crop box can be applied to the deformation, so that the deformation is only performed inside the box. This greatly speeds up the visualization. For this case, a different shader can be used on a per-block basis.

Invoking Shader Program (Steps 209-213)

Figure 4:
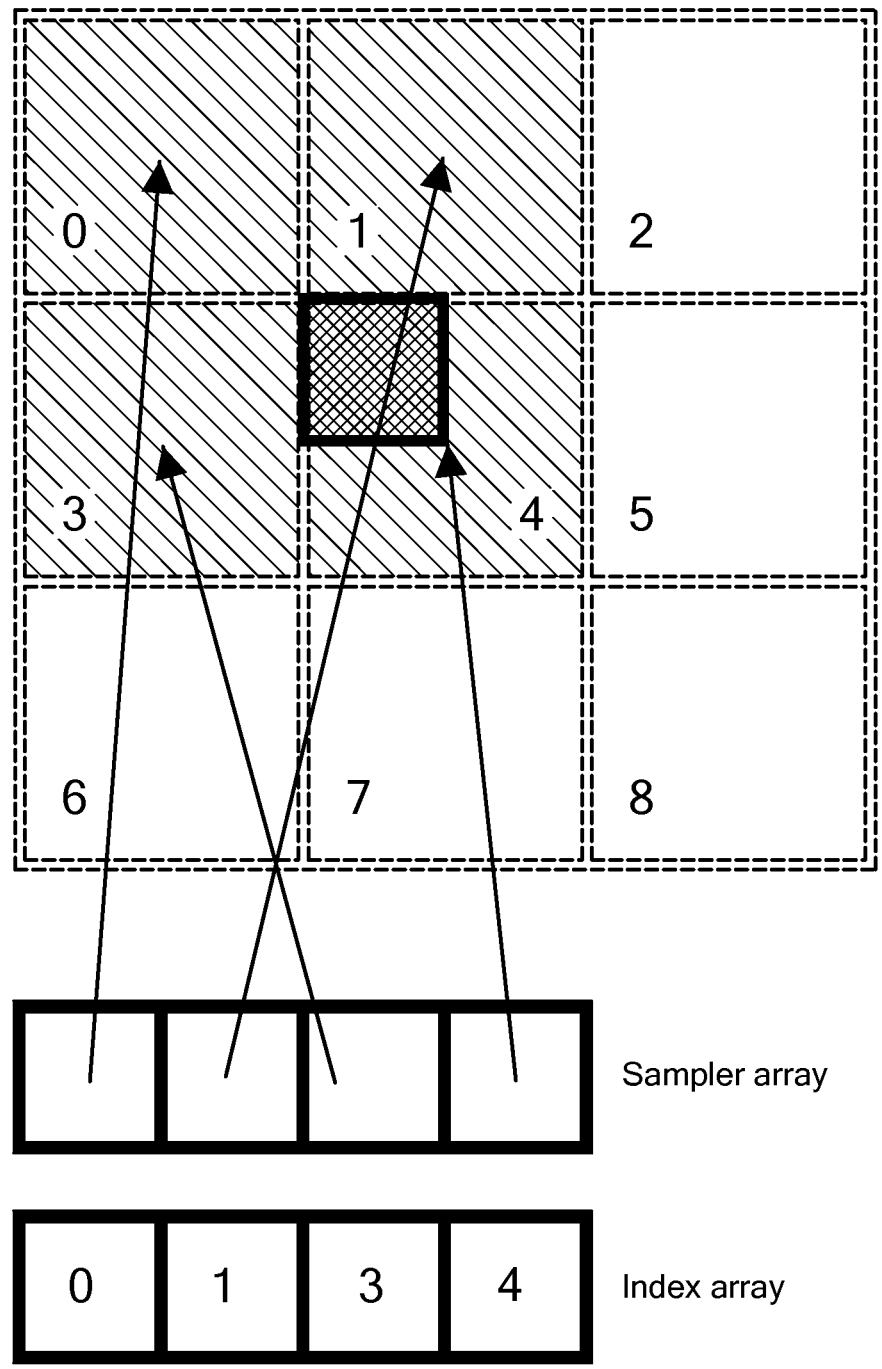
FIG. 4 shows brick access in a fragment shader used in the process of rendering deformable bricked volumes of data according to the invention.

Determination of the correct texture brick under deformation. Inside the fragment shader, for each texture coordinate (after adding the deformation), the appropriate texture brick is determined, that means the index of the texture brick is computed according to its position in the volume. The fragment shader receives two arrays as input. One array is the array of samplers that consist of the neighboring bricks. The second array records the index (in global texture space) of the brick texture in the corresponding entry of the first array. An example of this is shown in FIG. 4. With the knowledge of the index of the texture brick the sample is in after deformation, the array of indices can be searched for this particular index. Once the index is found, the corresponding sampler from the sampler array is sampled, after the texture coordinate has been transformed from global volume space into the local texture space of the brick. This approach affords flexibility, when it comes to different constraints on the deformation. For example, a deformation might be stronger in one dimension. In that case, more bricks in that direction can be loaded and passed on to the fragment shader. Note that we use an edge of two voxels on each texture brick in order to allow trilinear interpolation and pre-integrated transfer functions. Once the correct texture to sample from is determined, we can use the same texture for computing gradients and lookups into pre-integrated transfer functions. Accessing yet another texture is not necessary.

FIG. 4 shows the 4 bricks (400) of the two dimensional case that are accessed by the active block 402. In the three dimensional space, we need 8 texture bricks.

Figure 5:
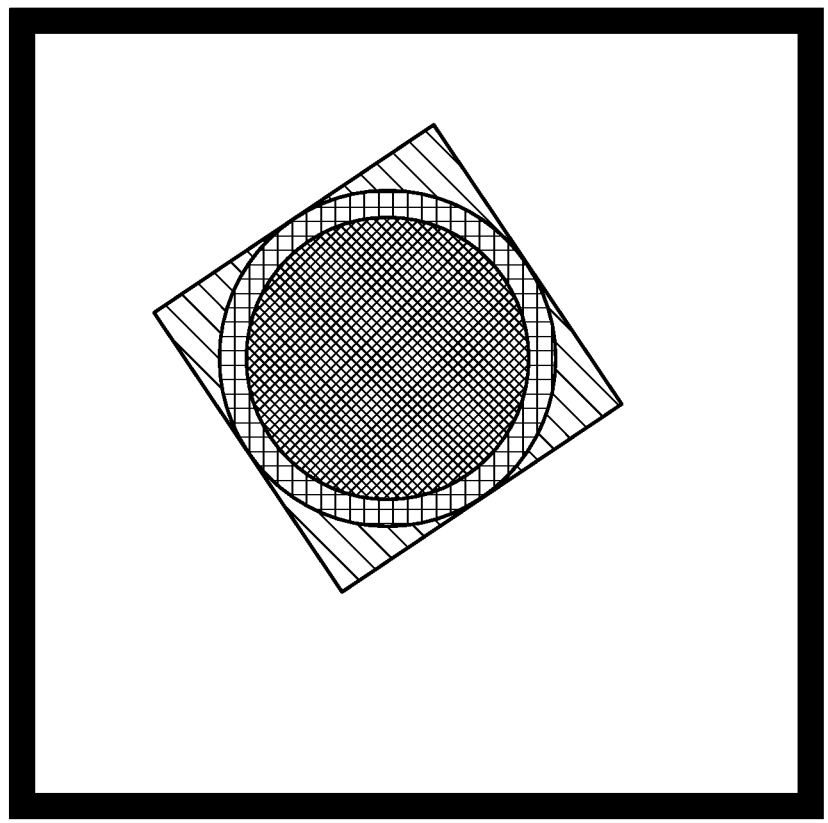
FIG. 5 shows the radius of influence for a local deformation.

FIG. 5 shows the acceleration structure for a sample transfer function that maps large parts of the volume to zero. The blocks 404 are the ones that would be drawn without the deformation. When the dynamic deformation comes into play, the blocks 402, neighboring the blocks 404, are drawn as well.

As result of this optimization, the rendering of a brick and the loading of the associated texture can be separated. It might be necessary to render a brick that contains information after deformation because the deformation reaches inside different bricks. The associated brick texture might not contain any visible voxel under the current transfer function, though. In this case the brick does not need to be loaded. For the fragment shader, this means that there is no texture to sample at some fragments. If the texture brick is not loaded, that means that the associated index is missing in the list of texture indices. For the case of slice-based volume visualization, the fragment is discarded. In the case of ray tracing, the value is skipped as invalid and does not contribute to the final image.

Figure 7B:
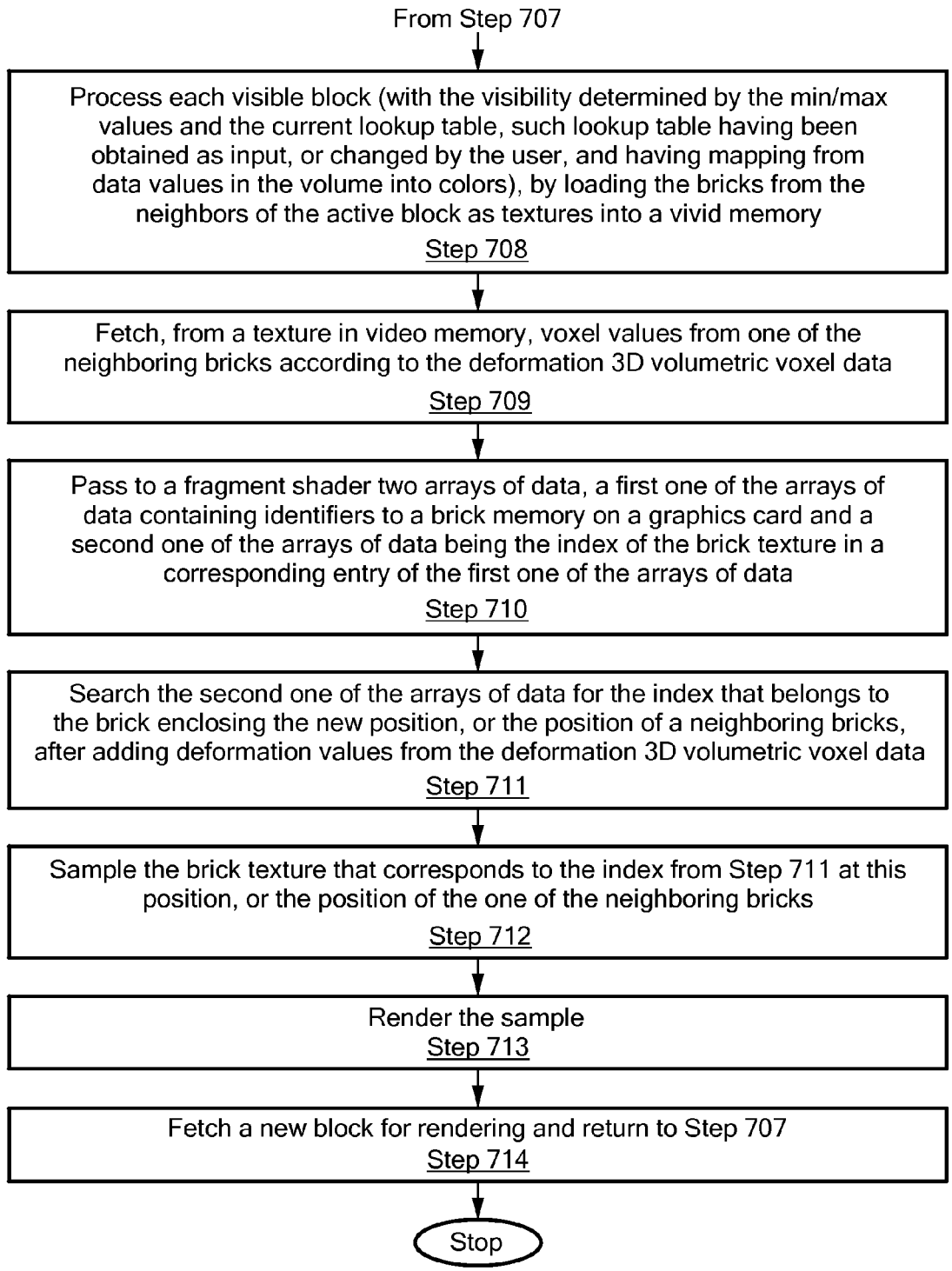
Figure 8:
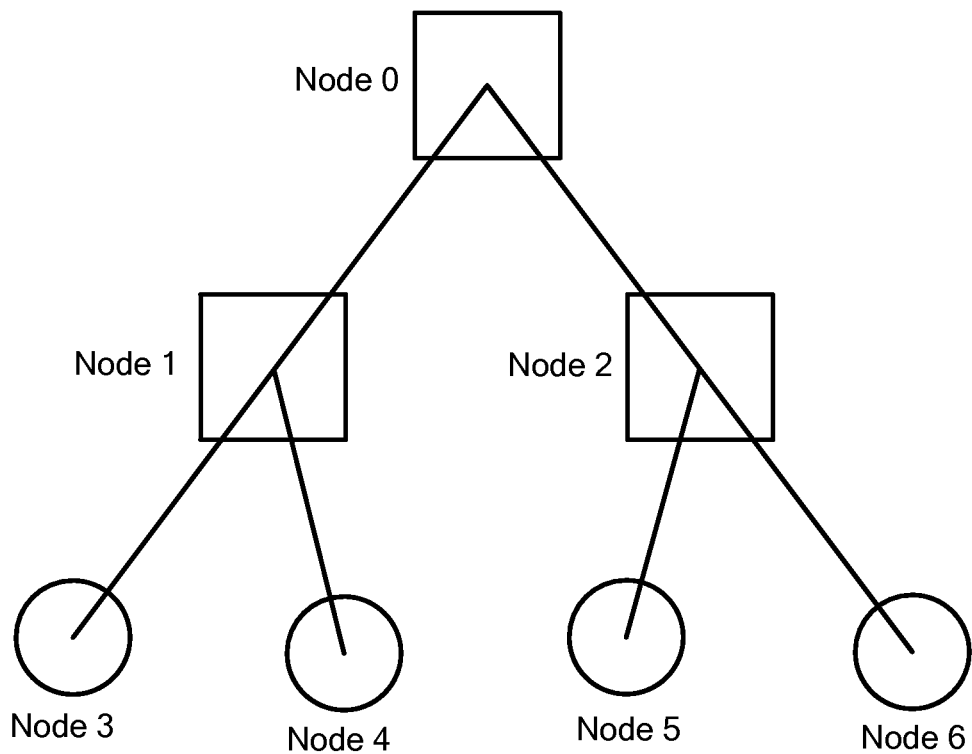
FIG. 8 is a hierarchical tree data structure according to the prior art.

Referring now to FIGS. 7A and 7B, a more detailed flow chart of the process is shown. The method includes:

Obtain and store a first (reference) 3D volumetric voxel data of a region, such region having therein an object to be rendered, Step 701:

Obtain and store a 3D second volumetric voxel data of a region, such region having therein an object to be rendered, Step 702:

Compare the first 3D volumetric voxel data with the second 3D volumetric voxel data to generate a deformation 3D volumetric voxel data, Step 703:

Using the first 3D volumetric voxel data, divide the region into a plurality of contiguous cubic bricks of textured data, each one of the bricks of data being subdivided into a plurality of contiguous cubic blocks of data with an index encoding the position of the block within the volume, Step 704:

Store the maximum and minimum voxel value of the data for each one of the blocks, Step 705:

Store a minimum and maximum value of the voxel data from both each one of the blocks and its neighbors, Step 706:

Process the blocks of the first 3D volumetric data in visibility order by iteratively processing over the plurality of contiguous bricks and at each iteration determining which half of the BSP tree is closer to a viewer and then processing the intersecting blocks of the second 3D volumetric data by iterating over intersecting blocks in the same way as for the first volumetric data volume and then designating a currently processed block as the active block, Step 707:

Process each visible block (with the visibility determined by the min/max values and the current lookup table, such lookup table having been obtained as input, or changed by the user, and having mapping from data values in the volume into colors, by loading the bricks from the neighbors of the active block as textures into a video memory, Step 708:

Pass to a fragment shader two arrays of data, a first one of the arrays of data containing identifiers to a brick memory on a graphics card and a second one the arrays of data being the index of the brick texture in a corresponding entry of the first one of the arrays of data, Step 709:

Fetch, from a texture in video memory, the deformation vector according to the current position in the volume data, Step 710:

Search the second one of the arrays of data for the index that belongs to the brick enclosing the new position, or the position of a neighboring bricks, after adding deformation values from the deformation 3D volumetric voxel data, Step 711:

Sample the brick texture that corresponds to the index from the Step 711 at this position, or the position of the one of the neighboring bricks: Step 712

Render the sample, Step 713:

Fetch a new block for rendering and return to Step 708.

More particularly, the method for rendering to a viewer an object from imaging data of the object, such imaging data including a first 3D volumetric voxel dataset of a region, such region having therein the object to be rendered and a second 3D volumetric voxel dataset of a region, such region having therein the object to be rendered includes the steps of:

(A) obtaining and storing the first 3D volumetric voxel dataset;

(B) obtaining and storing the second 3D volumetric voxel dataset;

(C) comparing the first 3D volumetric voxel dataset with the second 3D volumetric voxel dataset to generate a deformation 3D volumetric voxel dataset;

(D) dividing the first 3D volumetric voxel dataset into a first hierarchical tree comprising a plurality of contiguous cubic bricks of texture data, each one of the bricks being subdivided into a plurality of contiguous cubic blocks of data with an index encoding the positions of the blocks within the first 3D volumetric voxel dataset;

(E) storing a first set of maximum and minimum voxel values of the data for each one of the blocks in the first hierarchical tree;

(F) dividing the second 3D volumetric voxel dataset into a second hierarchical tree comprising a plurality of contiguous cubic bricks of textured data, each one of the bricks being subdivided into a plurality of contiguous cubic blocks of data with an index encoding the positions of the blocks within the second 3D volumetric voxel dataset;

(G) storing the a first set of maximum and minimum voxel values of the data for each one of the blocks in the second hierarchical tree;

(H) storing a second set of minimum and maximum voxel values of the data from both each one of the blocks and its neighboring blocks in the second hierarchical tree;

(I) processing the blocks in the first hierarchical tree in visibility order by first iteratively processing over the plurality of contiguous bricks and at each iteration determining which half of the first hierarchical tree is closer to the viewer of the object and thus generating an visibility order for the blocks;

(J) processing the blocks in the second hierarchical tree in visibility order by first iteratively processing over the plurality of contiguous bricks and at each iteration determining a half of the second hierarchical tree closer to the viewer of the object;

(K) designating a currently processed in block the second hierarchical tree as an active block;

(L) processing each visible block in the first hierarchical tree, with the visibility of one of the blocks being determined by the maximum and minimum values and a current lookup table in the video memory, such lookup table having mapping from data values into volumes of textured data into colors, by storing the bricks from the neighbors of the active block as textures in the video memory;

(M) passing to a fragment shader operating a graphics card, two arrays of data, a first one of the arrays of data containing identifiers to brick textures on a graphics card and a second one the arrays of data being the index used to encode the spatial position of the brick in the volumes of textured data in the video memory in a corresponding entry in the fragment shader of the first one of the arrays of data;

(N) fetching from the video memory one of the a textures stored therein and a deformation vector from the deformation 3D volumetric voxel data according to the current position of a sample in the second volume;

(O) searching the second one of the arrays of data in the fragment shader for the index belonging to the one of the bricks enclosing one of the bricks neighboring the active brick after adding the deformation vector from the deformation 3D volumetric voxel data;

(P) sampling the brick texture comprising reading from the video memory the volume of texture data, with an additional tri-linear interpolation step performed automatically by the graphics card, corresponding to the index in the second one of the arrays corresponding to the brick enclosing a new position such new position being the position of the active brick or one of the neighboring bricks; and (Q) rendering a sample of the object comprising translating the sample brick texture value into a color using the lookup table.

Other Embodiments

On-The-Fly Computation Versus Resampling

While the previous sections deal with the on-the-fly computation of deformations, in the case of static deformations, resampling of the volume offers advantages. These include the possibility of more costly, but higher-quality reconstruction filters for the deformed volume as well as speed advantages since the shader become simpler and more efficient, especially in the case of a gradient-computation.

The resampling can be performed either in the computer main memory, in OpenGL memory directly or with the help of a GPGPU framework. When loading a brick from main memory to texture memory, the resampling can be performed and the resampled brick is available. Optionally, the result of the resampling can be written back to main memory, so the resampling is not lost, when a brick is removed from the video memory. Since the min-max information for empty space skipping is incorrect after the resampling step, a GPU-based reduction operation is necessary to compute the correct values. Reduction operations map several (typically many) elements of input data to one element of output data. In this case the reduction operations consist of mapping the data elements of one brick to the minimum and maximum value that is contained in this brick. This operation can be performed very fast on the GPU.

Future hardware is likely to make resampling much cheaper. The resampler could also be combined with a decoder and any other transformer to the volume that output sub-volume sequences in rectilinear grid for rendering. Under that condition, on-the-fly resampling could be a better choice. Furthermore, duplicate brick borders are necessary for computing gradients for on-the-fly computation. When the resampling is combined with precomputing of gradients, the duplication is not necessary anymore.

This step would come after the shader processing in Step 216 (FIG. 2C), since the results of the shader processing have to be recorded in a texture as well as the reduction step performed.

Multiple Deformation Grids

Figure 6:
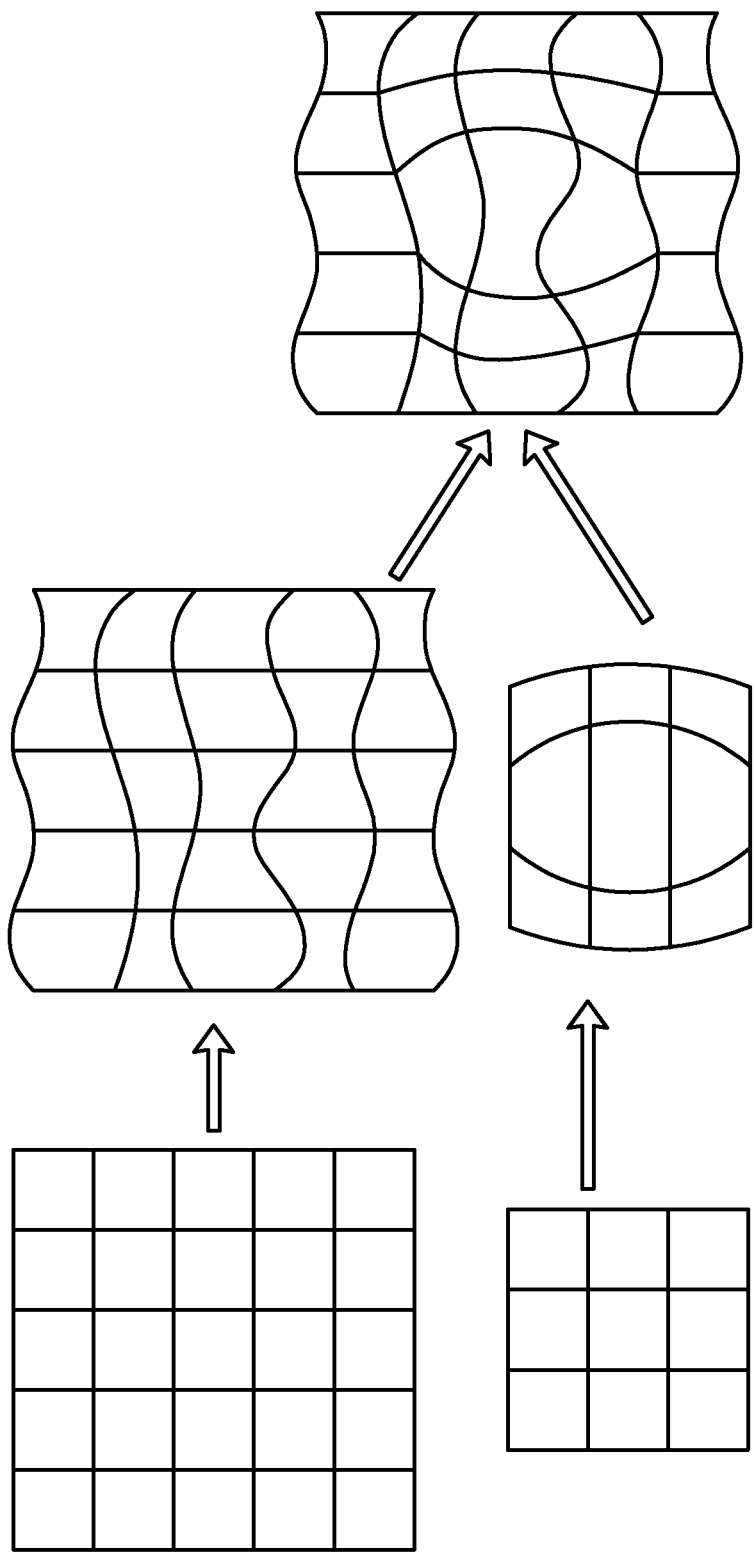
FIG. 6 shows the process of combining a global with local deformation.

The output of automatic registration algorithms can often be improved by expert users with domain knowledge. Therefore, offering a manual correction step is advantageous. In this step, the user is able to correct the deformation field interactively. For this purpose, multiple deformation fields for different regions—possibly at a better resolution than the global deformation field—can be used. Instead of saving the local deformation field, only the difference between the local and the global deformation field is saved. This simplifies the computation of the deformation. An example diagram for this approach is depicted in FIG. 6. The upper part of the diagram shows the global deformation that is modified by the local deformation in the lower part. This second deformation, however, is locally restricted.

In order to keep the deformation continuous and not to introduce artifacts, the local deformation field either needs to be zero at the edges or the margin of the local deformation field has to be blended with the global deformation field. Several local deformation fields can be used independently, if they overlap, care has to be taken again, as not to introduce discontinuities.

This setup is shown in FIG. 5. The volume marked with the black borders is deformed by a global deformation field. The square with the hatching 500 stands for a local deformation field that applies to the part of the volume it covers. If the deformation field is continuous with the global deformation field along its edges no blending is necessary. If this is not the case, only the part of the local deformation field indicated by the circle 502 is used without modification, the rest needs to be blended with the global deformation field. The blending function weighs the global field more towards the edge and the local deformation field more towards the circle 502. Outside the orange border 504, possibly only the global deformation field is used. Even though the deformation field is stored as a volume block, the region of influence can be a sphere.

When using several deformation fields the resampling and the on-the-fly approach to deformation can be combined: Using the resampling approach for one static deformation field, the on-the-fly approach can be used for a more dynamic deformation. In order to speed up the visualization, the deformation fields can be restricted to specific areas, so that only for the blocks that intersect deformation areas, the more complicated shaders have to be used.

This technique is useful for registration visualization. In this application, volumes are registered, meaning the corresponding points are matched. This allows the physician to assess the result of treatment, tumor growth etc. In the usual case, a rigid registration is performed before the non-rigid registration. The rigid transformation only rotates and shifts (perhaps scales) the volume, in order to compensate for different patient positions. In the next step, organ deformation/movements are accounted for by a non-rigid registration step. This non-rigid registration step then provides the deformation field. If the user wants to modify/correct the result of the non-rigid registration in some specific area, this can be done by manipulating a local deformation field that is only applied to the area that is modified.

This embodiment modifies Step 216 (FIG. 2C), (the shader processing) since the two deformation fields can be blended inside the shader program.

Maximum Intensity Projection

In a variation of the common direct volume rendering technique, instead of compositing volume samples as color opacities, only the maximum intensity projections are used. The maximum intensity projection is a special case, since there is no visibility order dependency. So instead of an image-order approach, an object order approach like splatting computes the contribution of samples to the final image. This approach has the advantage that bricks can be processed independently, despite the deformation. When using a slicing based approach, several bricks have to be considered at once. With point-sprites the splatting approach can be accelerated by graphics hardware as well.

This embodiment changes Step 206 (FIG. 2B), since the blocks do not have to be processed in visibility order. The step 206 can be skipped, instead blocks can be processed in any order. In the more detailed FIG. 7B, the step 707 can be skipped, instead an arbitrary order of blocks can be used.

Deformed Geometry for Ray Casting

Looking up the appropriate texture in the fragment shader, works for both slicing-based approaches and ray casting. For ray casting an approach that is based on deforming the boundary geometry of the blocks that are rendered is possible as well. In order for this to work, the geometry of the blocks has to be tessellated at a sufficient level, so that the deformation of the boundary is fine enough. The volumes that map to a specific block after the deformation have to be continuous, for this approach to work. This, however, seems to be a reasonable constraint on the deformation field. A depth-peeling approach is necessary in order to visualize the deformed blocks. After all, a ray might encounter first block A then block B and then block A again, due to the deformation. The number of participating blocks should be fairly small, this corresponds to a relatively small scale of the non-rigid deformation. This approach consists of the following steps:

Render the faces of a brick using the tessellated grid in the non deformed form.

Use a vertex shader and a vertex texture to offset each vertices of the grid according to the deformation field.

Then each fragment is linear interpolated from the deformed vertices.

In the fragment shader, each fragment is further deformed according to the deformation field to compensate the difference between the deformation field and linear interpolation.

This embodiment changes the Step 216 (FIG. 2C), the shader processing. Raytracing has to be performed.

A number of embodiments of the invention have been described. Nevertheless, it will be understood that various modifications may be made without departing from the spirit and scope of the invention. Accordingly, other embodiments are within the scope of the following claims.

What is claimed is:

1. A method for rendering with a processor a deformable 3D volumetric voxel dataset obtained from an imaging device, comprising:

the processor dividing the deformable 3D volumetric voxel dataset into a hierarchical tree prior to determining a viewing direction, the hierarchical tree specified by a plurality of contiguous cubic bricks in a plurality of texture data, each one of the bricks being subdivided into a plurality of contiguous cubic blocks of data with a position index encoding the positions of the blocks within the deformable 3D volumetric voxel dataset, wherein each block that is not further partitioned is a leaf block;

the processor creating a neighborhood data structure for each leaf block in the hierarchical tree, wherein the neighborhood data structure includes for each leaf block a reference to all bricks neighboring the leaf block;

the processor determining for each leaf block in the tree hierarchical structure a set of a minimum and a maximum value of the voxels in the leaf block and storing the set;

the processor creating for each leaf block a first and a second array, the first array containing an identification of a texture of a brick in the neighborhood structure of the leaf block, the second array containing corresponding indices determining a position of a brick in the deformable 3D volumetric voxel dataset;

the processor fetching from a video memory a deformation vector according to a current position of a sample in the deformable 3D volumetric voxel dataset;

the processor adding the deformation vector to the current position of the sample to determine a deformation index related to a deformation position of the sample in the plurality of texture data;

the processor searching the second array for the deformation index and determining an array index;

the processor fetching the identification of the texture of the brick from the first array based on the array index;

the processor fetching a value from the texture identified based on the texture identification from the first array at the deformation position; and the processor rendering the sample according to the value fetched in the previous step to render the deformable 3D volumetric voxel dataset as a deformed 3D volumetric voxel dataset without deforming the plurality of texture data.

2. The method of claim 1, further comprising:

the processor updating information about minimum and maximum values for each block based on the minimum and maximum values of the bricks referenced by the neighborhood data structure for that particular block.

3. The method of claim 1, further comprising the processor searching the second array in a fragment shader for an index belonging to a brick neighboring the brick of the active block that contains the new index after computing the index from the current position and the deformation vector.

4. The method of claim 3, further comprising the processor sampling a brick texture identified by the first array including reading from the video memory the volume of texture data, corresponding to the index in the second array.

5. The method of claim 4, further comprising the processor rendering a sample of the sampled brick structure.

6. The method of claim 1, wherein a deformation is determined by registering the deformable 3D volumetric voxel dataset to a separately obtained 3D volumetric voxel dataset.

7. The method of claim 1, wherein a deformation of a brick in the deformable 3D volumetric voxel dataset is not greater than a size of a brick.

8. The method of claim 1, wherein a deformation of a brick in the deformable 3D volumetric voxel dataset is not greater than a size of half a brick if the neighborhood structure is large enough to hold 7 closest bricks of the active block and the brick enclosing the active block.

9. The method of claim 1, further comprising deforming each of a plurality of regions in the deformable 3D volumetric voxel dataset in accordance with a different deformation field selected from multiple deformation fields.

10. The method of claim 1, wherein the leaf blocks are rendered in visibility order.

11. A system to render a deformable 3D volumetric voxel dataset obtained from an imaging device, comprising:

memory to store data; and a processor to perform the steps:

dividing the deformable 3D volumetric voxel dataset into a hierarchical tree prior to determining a viewing direction, the hierarchical tree specified by a plurality of contiguous cubic bricks in a plurality of texture data texture data, each one of the bricks being subdivided into a plurality of contiguous cubic blocks of data with an index encoding the positions of the blocks within the deformable 3D volumetric voxel dataset, wherein each block that is not further partitioned is a leaf block;

creating a neighborhood data structure for each leaf block in the hierarchical tree, wherein the neighborhood data structure includes for each leaf block a reference to all bricks neighboring the leaf block;

determining for each leaf block in the tree hierarchical structure a set of a minimum and a maximum value of the voxels in the leaf block and storing the set;

creating for each leaf block a first and a second array, the first array containing an identification of a texture of the bricks in the neighborhood structure of the leaf block, the second array containing corresponding indices determining a position of a brick in the deformable 3D volumetric voxel dataset;

fetching from a video memory a deformation vector according to a current position of a sample in the deformable 3D volumetric voxel dataset;

adding the deformation vector to the current position of the sample to determine a deformation index related to a deformation position of the sample in the plurality of texture data;

searching the second array for the deformation index and determining an array index;

fetching a value from the texture identified based on the array index applied to the first array; and rendering the sample according to the value fetched in the previous step to render the deformable 3D volumetric voxel dataset as a deformed 3D volumetric voxel dataset without deforming the plurality of texture data.

12. The system of claim 11, the processor further performing the steps:

updating information about minimum and maximum values for each block based on the minimum and maximum values of the bricks referenced by the neighborhood data structure for that particular block.

13. The system of claim 12, the processor further performing the step searching the second array in the fragment shader for an index belonging to a brick neighboring the brick of the active block that contains the new index after computing the index from the current position and the deformation vector.

14. The system of claim 13, the processor further performing the step sampling a brick texture identified by the first array including reading from the video memory the volume of texture data, corresponding to the index in the second array.

15. The system of claim 14, the processor further performing the step rendering a sample of the sampled brick structure.

16. The system of claim 11, wherein the deformation vector is determined by registering the deformable 3D volumetric voxel dataset to a separately obtained 3D volumetric voxel dataset.

17. The system of claim 11, wherein a deformation of a brick in the deformable 3D volumetric voxel dataset is not greater than a size of a brick.

18. The system of claim 11, wherein a deformation of a brick in the deformable 3D volumetric voxel dataset is not greater than a size of half a brick if the neighborhood structure is large enough to hold 7 closest bricks of the active block and the brick enclosing the active block.

19. The system of claim 11, the processor further performing the step deforming each of a plurality of regions in the deformable 3D volumetric voxel dataset in accordance with a different deformation field selected from multiple deformation fields.

20. The system of claim 11, wherein the leaf blocks are rendered in visibility order.

\* \* \* \* \*